Oct. 2, 1923.

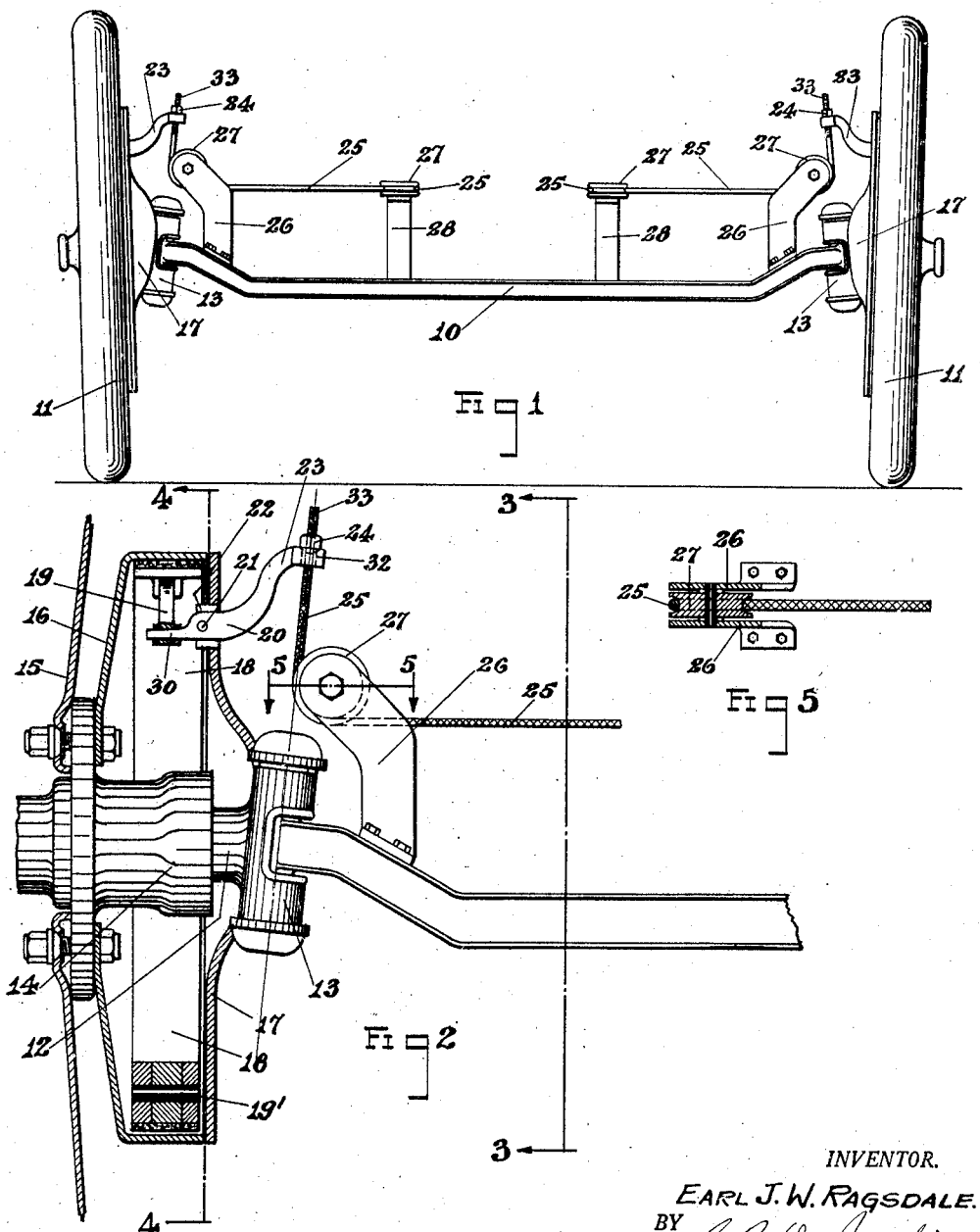

E. J. W. RAGSDALE 1,469,484

BRAKE ACTUATING MECHANISM FOR STEERING WHEELS

Filed June 16, 1922   2 Sheets-Sheet 2

WITNESS:—
Walter M. Trout

INVENTOR.
EARL J. W. RAGSDALE
BY
ATTORNEY

Patented Oct. 2, 1923.

1,469,484

UNITED STATES PATENT OFFICE.

EARL J. W. RAGSDALE, OF NORRISTOWN, PENNSYLVANIA, ASSIGNOR TO BUDD WHEEL COMPANY, OF PHILADELPHIA, PENNSYLVANIA, A CORPORATION OF PENNSYLVANIA.

BRAKE-ACTUATING MECHANISM FOR STEERING WHEELS.

Application filed June 16, 1922. Serial No. 568,837.

*To all whom it may concern:*

Be it known that I, EARL J. W. RAGSDALE, a citizen of the United States, residing at Norristown, Pennsylvania, have invented certain new and useful Improvements in Brake-Actuating Mechanism for Steering Wheels, of which I declare the following to be a full, clear, and exact description.

My invention relates to improvements in brake actuating mechanism for steering wheels and has to do, more particularly, with actuating means for brakes mounted on the pivoted steering wheels of motor vehicles.

The main object of my invention is to provide simple, inexpensive and effective actuating connections between the brake controls on the automobile chassis and the brakes mounted on the pivoted steering wheels.

Another object of my invention is to provide brake actuating mechanism in which the steering wheel brakes are actuated by a cable connected to a control member on the fixed part of the chassis, the cable being so disposed and connected to the brakes on the pivoted wheels, that the swiveling movement of the steering wheels has no effect on the actuating cable.

Another object of my invention is to provide simple and effective means for connecting the actuating mechanism and the brakes mounted on the pivoted steering wheels, so that the swiveling movements of the wheels in steering are without any effect upon the brake-actuating mechanism.

Further objects, and objects relating to economies and details of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in elevation of the front axle of a motor vehicle embodying my invention.

Fig. 2 is an enlarged view of one end of the axle, the wheel and brake mechanism carried thereby being shown in section.

Fig. 5 is a detail, sectional view on line 5—5 of Fig. 2.

In the drawings, the same reference numerals refer to the same parts throughout the several views, and the sectional views are taken looking in the direction of the arrows at the ends of the section lines.

Figure 3:
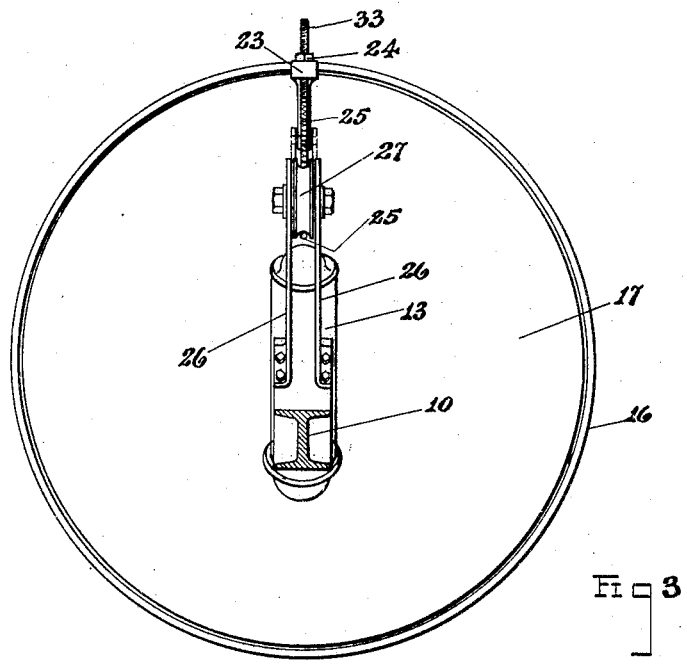
Fig. 3 is a sectional view on line 3—3 of Fig. 2.
Figure 4:
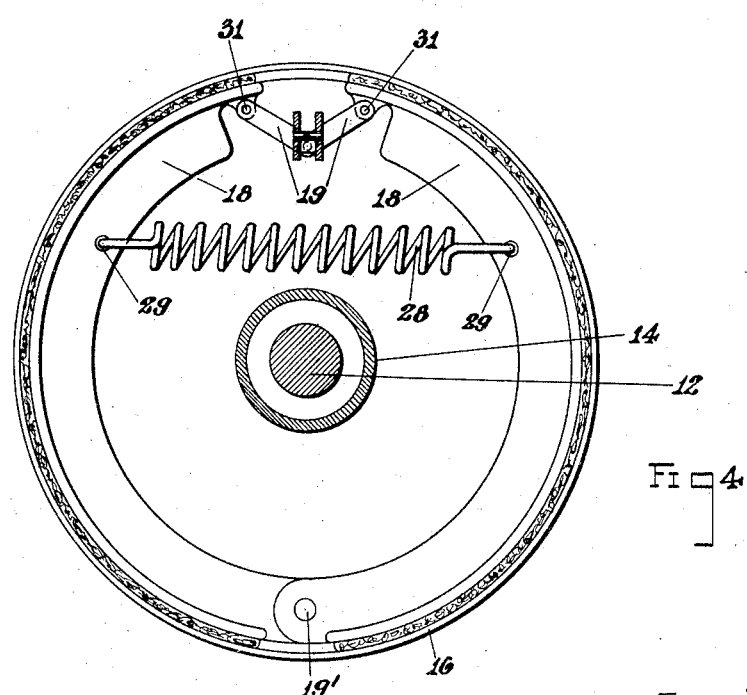
Fig. 4 is a sectional view on line 4—4 of Fig. 2, showing the brake mechanism in elevation.

The chief problem present in the application of brakes to the steering wheels of a motor vehicle is to provide means for actuating the brakes which are not effected by the swiveling movements of the steering wheels. The wheels are usually mounted at the ends of the axle so as to pivot or swivel around substantially vertical axes, and the brake mechanism necessarily partakes of these swiveling movements of the wheels. The brakes are actuated from a control or controls carried by the automobile frame and it is essential that the connections between the control and the brake mechanism should be such that the swiveling movements of the wheels have no effect upon them, otherwise, the turning of the wheels, for instance, when the car turns a corner, might interfere with the proper application or release of the brakes. As pointed out above, the object of my invention is to provide simple, inexpensive and effective connections between the brake control means and the brake mechanism, which connections are not affected by any swiveling movements of the wheels.

In general, I accomplish the objects of my invention by providing brake mechanism which partakes of the swiveling movement of the steering wheel and cooperates with the usual brake drum fixed to and rotating with the wheel. This brake mechanism includes a brake-operating member which also swivels with the wheel. The brake-operating member is actuated by a flexible operating cable connected to the brake control and to said member and which engages, at a point on the axis around which the wheel swivels, a device for changing the direction of said cable. The stretch of cable between this device, which is fixed, and the point of connection with the brake-operating member is always of the same length, since the cable engages this device at a point on the pivotal axis around which the wheel and brake mechanism swivels and the point of connection with the brake-operating member is always at the same distance from this axis. This device for changing the direction of the actuating cable may be a pin, stud, idler pulley or similar device. A pulley is preferable in order to reduce the friction on the actuating cable. I prefer to connect the cable to the brake-operating member at a point which also lies on the axis around which the wheel swivels. The result of this is that the entire stretch of cable between the direction-changing device and the brake-operating member lies in the pivotal axis of the wheel. The connection between the cable and the brake-operating member may be adjustable to provide for easy adjustment of the brakes.

Referring to the numbered parts of the accompanying drawings, in which I have illustrated one embodiment of my invention in connection with brake actuating mechanism for the front wheels of a motor vehicle, the front axle, 10, has the front or steering wheels, 11, mounted at the ends thereof so as to swivel and rotate with respect thereto, in the usual manner. The wheel hubs, 14, are rotatably mounted on the steering spindles, 12, the knuckles, 13, of which are journaled on the ends of the axle, 10, so as to swivel around an axis which, in this case, is inclined slightly from the vertical, as appears in Fig. 1. The wheel disc, 15, is secured to a flange on the hub, 14, and the brake drum, 16, is fastened to the same flange. The brake mechanism is carried by the plate, 17, which is secured to the knuckle, 13, so that it swivels with the wheel, and comprises a pair of brake shoes, 18, which engage the inner surface of the brake drum and are pivotally supported from the plate, 17, on the stud or pin, 19′. These brake shoes are normally drawn toward each other, and away from the braking surface of the brake drum, by the spring 28, the ends of which are connected to opposite brake shoes, at 29. The brake shoes are expanded into braking contact with the brake drum, against the tension of the spring, 28, by the toggle linkage consisting of the links, 19, connected at 31, to the free ends of the brake shoes. A brake-operating lever, 20, extends through a slot in the plate, 17, and is pivoted, at 21, to ears, 22, projecting from the plate at the sides of the slot. The inner end, 30, of the brake-operating member, 20, extends through aligned openings in the adjacent ends of the links, 19, and constitutes the pivotal connection between the said links of the toggle.

The brake-operating lever or member, 20, is actuated by a flexible cable, 25, the end of which is connected to the arm, 23, of said member. A threaded rod, 33, secured to the end of the cable, extends through a hole, 32, formed in the end of arm, 23, and a nut, 24, screwed on said threaded rod, engages the arm and thus makes an adjustable connection between the cable and member, 20. The cable, 25, passes around the idler pulley, 27, carried by the bracket, 26, fixed on the axle, 10, near the end thereof, and thence around another idler pulley, 29, carried by a bracket, 28, also fixed on the axle. The brake mechanism for the other front wheel is actuated by a similarly arranged cable, 25, and the inner ends of the two cables may be connected together and to a common member by which tension can be put upon them from the brake control.

It is to be noted that the cable, 25, leaves the pulley, 27, as it passes towards the point of connection with the arm, 23, of the brake-operating member, at a point which lies in the axis around which the steering spindle, wheel hub and all parts carried thereby, swivel in steering movements of the wheel. Consequently, the distance from this point to a point on any non-rotating part swiveling around this axis will always be the same and, since the arm, 23, is such a swiveling, non-rotating part, the distance between the end of said arm and the pulley, 27, will be the same for all positions of the wheel about such axis. The swiveling of the wheel in steering, therefore, has no effect on the operating cable and cannot interfere with the proper application of the brakes. In the particular embodiment illustrated here, the hole, 32, also lies on the axis around which the wheel swivels so that the entire stretch of cable between pulley, 27, and arm, 23, lies in the axis of pivotal movement of the wheel.

When the driver puts a tension on the cables, 25, through the brake control lever, (not shown) the brake-operating members or levers, 20, are rocked on their pivots, 21, tending to straighten the toggle linkages, 19, between the ends of the brake shoes, to expand the latter into braking contact with the brake drums against the tension of springs, 28. When the tension on the cables is released, the springs, 28, return the brake shoes to normal position. The brakes may be adjusted by adjusting the nuts, 24, on the ends of the threaded rods, 33.

The idler pulleys, 27, constitute devices for changing the direction of the actuating cables, 25, and the gist of my invention consists in so locating these direction-changing devices that the points, at which the straight stretches of cable from said direction-changing devices to the brake-operating members begin, are located on the axes around which the steering spindles and, consequently, the brake mechanisms swivel. The idler pulleys, 27, are the direction-changing devices but I am not to be restricted to such pulleys as any other expedient for changing the direction of the cable may be used as, for instance, pins, studs, or eyes engaged by the cable. I find it very desirable also to locate the point, at which the cable, 25, is connected to the arm of the brake-operating member, 20, on the axis around which the wheel swivels as, in that case, no movement whatsoever of that stretch of the cable is produced by swiveling movements of the wheel in steering. The adjustment of the brakes is very easy and convenient as the nut, 24, by which such adjustment is made, is so located that it is very readily accessible. Furthermore, this brake-actuating mechanism is very light, simple and inexpensive and permits the application of front wheel brakes to motor vehicles without the expense, added weight and complications which, heretofore, have necessarily followed the use of brakes on the front or steering wheels.

I am aware that the brake-actuating mechanism disclosed herein may be altered considerably without departing from the spirit of my invention and, therefore, I claim my invention broadly, as indicated by the appended claims.

Having thus described my invention, what I claim as new and useful and desire to secure by Letters Patent is:—

1. In a motor vehicle, the combination of a relatively stationary axle, a spindle pivoted at the end of said axle, a wheel revolubly mounted on said spindle, a brake drum fixed to revolve with the wheel, brake mechanism coacting with said brake drum and mounted to swivel with said spindle, a cable connected to actuate said brake mechanism, and a direction-changing device for said cable positioned to engage the cable at a point on the axis around which said spindle is pivoted.

2. In a motor vehicle, the combination of a relatively stationary axle, a spindle pivoted at the end thereof, a wheel mounted on said spindle, a brake drum fixed to revolve with said wheels, brake mechanism coacting with said brake drum and mounted to swivel with said spindle, a cable connected to actuate said brake mechanism, and a device for changing the direction of said cable so located as to form a stretch of cable leading to the brake mechanism from a point on the axis around which said brake mechanism swivels.

3. In a motor vehicle, the combination of a relatively stationary axle, a spindle pivoted at the end thereof, a wheel mounted on said spindle, a brake drum fixed to revolve with the wheel, brake mechanism coacting with said brake drum and mounted to swivel with said spindle, a cable connected to actuate said brake mechanism, and a device for changing the direction of said cable, said device being carried by the axle and so positioned thereon that the cable engages the same at a point on the axis around which the brake mechanism swivels.

4. In a motor vehicle, the combination of a relatively stationary axle, a spindle pivoted at the end thereof, a wheel mounted on said spindle, a brake drum fixed to revolve with the wheel, brake mechanism coacting with said brake drum and mounted to swivel with said spindle, said brake mechanism including a pivoted brake-operating lever, a cable connected to one arm of said lever, and a device for changing the direction of said cable mounted on a relatively stationary part and engaging the cable at a point on the axis around which the brake mechanism swivels.

5. In a motor vehicle, the combination of a relatively stationary axle, a spindle pivoted at the end thereof, a wheel mounted on said spindle, a brake drum fixed to revolve with the wheel, brake mechanism coacting with said brake drum and mounted to swivel with the spindle, a cable for actuating said brake mechanism, and a part fixed to the axle and engaging the cable to form a stretch thereof leading to the brake mechanism from a point on the axis around which said brake mechanism swivels.

6. In a motor vehicle, the combination of a relatively stationary axle, a spindle pivoted at the end of said axle, a wheel mounted on said spindle, a brake drum fixed to revolve with the wheel, brake mechanism coacting with said brake drum and mounted to swivel with the spindle, a cable for actuating said brake mechanism, and a part fixed on said axle and engaging the cable to form a straight stretch thereof leading to the brake mechanism and lying on the axis around which said brake mechanism swivels.

7. In a motor vehicle, the combination of a relatively stationary axle, a spindle pivoted at the end of said axle, a wheel mounted on said spindle, a brake drum fixed to revolve with said wheel, brake mechanism coacting with said brake drum and mounted to swivel with said spindle, said brake mechanism including a pivoted brake-operating lever, a cable connected to one arm of said lever at a point on the axis around which said brake mechanism swivels, and a part fixed on said axle and engaging the cable at a point also on said axis to form a stretch of said cable leading to said arm.

8. In a motor vehicle, the combination of a relatively stationary axle, a spindle pivoted at the end thereof, a wheel mounted on said spindle, a brake drum fixed to revolve with the wheel, brake mechanism coacting with said brake drum and mounted to swivel with said spindle, said brake mechanism including a pivoted brake-operating lever, a cable adjustably connected to one arm of said lever at a point on the axis around which said brake mechanism swivels, and a device for changing the direction of said cable, engaging said cable at a point also on said axis.

9. In a motor vehicle, the combination of a relatively stationary axle, a spindle pivoted at the end thereof, a wheel mounted on said spindle, a brake drum fixed to revolve with the wheel, brake mechanism mounted to swivel with said spindle and including a pair of pivoted brake shoes coacting with the brake drum, a toggle interposed between the free ends of said brake shoes, and a pivoted brake-operating lever having one arm engaging the toggle to actuate the same, a cable connected to the opposite arm of said lever, and a direction-changing device carried by the axle and engaging the cable at a point on the axis around which said brake mechanism swivels.

10. In a motor vehicle, the combination of a relatively stationary axle, a spindle pivoted at the end thereof, a wheel mounted on said spindle, a brake drum fixed to revolve with said wheel, a brake-support carried by said spindle and swiveling therewith, brake mechanism carried by said support and including a pair of brake shoes pivoted thereto and coacting with the brake drum, a toggle interposed between the free ends of said brake shoes, and a brake-operating lever pivoted on said support and having one arm engaging the toggle to actuate the same and the other arm projecting above the axle, an actuating cable connected to the opposite end of said lever, and a direction-changing device on the axis around which said brake mechanism swivels.

11. In a motor vehicle, the combination of a relatively stationary axle, a spindle pivoted at the end thereof, a wheel mounted on said spindle, a brake drum fixed to revolve with said wheel, a brake-support carried by said spindle and swiveling therewith, brake mechanism carried by said support and including a pair of brake shoes pivoted thereto and coacting with the brake drum, a toggle interposed between the free ends of said brake shoes, and a brake-operating lever pivoted on said support and having one arm engaging the toggle to actuate the same and the other arm projecting above the axle, an actuating cable connected to said last-mentioned arm at a point on the axis around which the brake mechanism swivels, and a direction-changing device carried on a relatively stationary part and engaging the cable at a point also on said axis.

12. In a motor vehicle, the combination of a relatively stationary axle, a spindle pivoted at the end of said axle, a wheel mounted on said spindle, a brake drum fixed to revolve with said wheel, brake mechanism coacting with said brake drum and mounted to swivel with the spindle, a cable connected to actuate said brake mechanism, and a pulley mounted on a relatively stationary part and engaged by the cable at a point on the axis around which the brake mechanism swivels.

13. In a motor vehicle, the combination of a relatively stationary axle, a spindle pivoted at the end of said axle, a wheel mounted on said spindle, a brake drum fixed to revolve with said wheel, brake mechanism coacting with said brake drum and mounted to swivel with the spindle, a cable connected to actuate the brake mechanism, and a pulley mounted on a relatively stationary part and so positioned that the cable is tangent to the periphery of said pulley at a point on the axis around which the brake mechanism swivels.

14. In a motor vehicle, the combination of a relatively stationary axle, a spindle pivoted at the end thereof, a wheel mounted on said spindle, a brake drum fixed to revolve with said wheel, brake mechanism coacting with said brake drum and mounted to swivel with said spindle, said mechanism including a pivoted brake-operating lever, an actuating cable connected to one arm of said lever, and a pulley mounted on a relatively stationary part and so positioned as to engage the cable at a point on the axis around which the brake mechanism swivels.

15. In a motor vehicle, the combination of a relatively stationary axle, a spindle pivoted at the end thereof, a wheel mounted on said spindle, a brake drum fixed to revolve with said wheel, brake mechanism coacting with said brake drum and mounted to swivel with said spindle, said mechanism including a pivoted brake-operating lever, an actuating cable connected to one arm of said lever at a point on the axis around which said brake mechanism swivels, and a pulley mounted on a relatively stationary part and so positioned as to engage the cable at a point also on the said axis.

16. In a motor vehicle, the combination of a relatively stationary axle, a spindle pivoted at the end thereof, a wheel mounted on said spindle, a brake drum fixed to revolve with said wheel, brake mechanism coacting with said brake drum and mounted to swivel with the spindle, said brake mechanism including a pivoted brake-operating lever, an actuating cable, an adjustable connection between said cable and one arm of said lever, and a pulley mounted on a relatively stationary part and engaged by the cable, said adjustable connection and pulley being so located that the stretch of cable between the pulley and said connection lies on the axis around which the brake mechanism swivels.

In testimony whereof, I affix my signature.

EARL J. W. RAGSDALE.